(12) United States Patent
Kern et al.

(10) Patent No.: US 6,256,268 B1
(45) Date of Patent: Jul. 3, 2001

(54) CD PLAYER FOR CD-LIKE RECORDING FORMATS

(75) Inventors: Alois Kern, Villingen-Schwenningen; Stefan Rapp, St. Georgen, both of (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/205,170

(22) Filed: Dec. 4, 1998

(30) Foreign Application Priority Data

Dec. 16, 1997 (DE) .............................................. 197 55 741

(51) Int. Cl.[7] .................................................. G11B 17/22
(52) U.S. Cl. ............................................ 369/32; 369/275.3
(58) Field of Search .......................... 369/59, 124, 44.29, 369/275.3; 711/113, 137, 156, 144, 115; 235/435, 494, 454; 345/501

(56) References Cited

U.S. PATENT DOCUMENTS

| | | | |
|---|---|---|---|
| 5,197,053 | 3/1993 | Baas ........................................ | 369/32 |
| 5,315,570 | * 5/1994 | Miura et al. ............................ | 369/58 |
| 5,499,225 | 3/1996 | Yoshimura ............................... | 369/58 |
| 5,537,387 | 7/1996 | Ando et al. ......................... | 369/275.1 |
| 5,701,384 | * 12/1997 | Park ......................................... | 386/70 |
| 5,764,610 | * 6/1998 | Yoshida et al. ......................... | 369/58 |
| 5,829,017 | * 10/1998 | Ohtsuka ................................. | 711/113 |
| 5,959,280 | * 9/1999 | Kamatani ............................... | 369/58 |
| 6,043,828 | * 3/2000 | Ort .................................... | 369/275.3 |
| 6,072,757 | * 6/2000 | Tajiri ...................................... | 369/58 |

FOREIGN PATENT DOCUMENTS 689 206A1 12/1995 (EP) .............................. G11B/19/02

OTHER PUBLICATIONS

German Search Report

* cited by examiner

*Primary Examiner*—Thang V. Tran
*Assistant Examiner*—Kim-Kwok Chu
(74) *Attorney, Agent, or Firm*—Joseph S. Tripoli; Paul P. Kiel

(57) ABSTRACT

A stand alone CD player for reading data from a recording medium having data formatted in accordance with CD-like recording formats, for example, CD-ROM, CD-I and CD-V, stored thereon. According to the present invention, the playback of data from a recording medium having data in such a recording format is made possible by a virtual table of contents generated by the stand alone CD player. The virtual table of contents also enables sequential access to data stored on the recording medium that has a table of contents that cannot be read by the present CD player.

10 Claims, 1 Drawing Sheet

CD PLAYER FOR CD-LIKE RECORDING FORMATS

FIELD OF THE INVENTION

The invention relates to a CD player for CD-like recording formats, such as, for example, CD-ROM, CD-I, CD-V and CD.

BACKGROUND OF THE INVENTION

In addition to the CD, which is generally known as Compact Disc, as digital recording medium for audio signals, further recording media are known which differ from the CD only to an insignificant extent in terms of their structure. When a music aficionado sees a CD, a computer specialist sees a CD-ROM. The designation CD-ROM indicates that what is involved here is a read-only storage medium, or a so-called compact disc read-only memory. While the CD-ROM was regarded primarily as a medium for text and data transmission at its inception, the so-called CD-I standard was then developed in order to extend the possibilities of use for the CD-ROM. In accordance with this standard, texts and data can be supplemented with images, graphics and music. Furthermore, the compact disc with video, known as CD-V, was created for the light music sector, enabling a combination of five to six minutes of video recording including sound and twenty minutes of high-quality digital sound recording on a disc with a diameter of 12 cm.

Despite the different recording formats, CD-like recording formats are involved since the recording media have a corresponding recording principle which consists in digital information storage in a virtually corresponding information track which can fundamentally be read by the same scanning system. However, the differences in the recording format mean that a CD-ROM, CD-I or CD-V, for example, cannot be played back by a CD player in the same way as by a playback device provided specifically for the recording medium. On the other hand, devices for recording formats which differ from the CD recording format are generally set up in such a way that they can also play back an audio CD. Furthermore, however, such devices have additional decoders and controllers for decoding the recording format and controlling the recording medium.

SUMMARY OF THE INVENTION

The object of the invention is to provide a CD player which enables CD-like recording formats to be played back with no additional outlay on hardware.

This object is achieved by means of the features specified in the main claim. Advantageous designs and developments are specified in subclaims.

The invention is based on the insight that in a CD player, it is not possible to access individual titles or, sequentially, the content of a recording medium having a recording format which differs from a CD. In principle, however, the common recording principle means that a recording medium having a recording format which differs from a CD can also be played back from start to finish without a break on a CD player. Random access to individual video sequences stored on a CD-I full motion video disc, for example, is not possible, however, since in the case of the CD-I the table of contents is not coded in the subcode but rather in the CD-ROM format. A CD player is not equipped with a requisite controller interface between the servo-processor of the CD player and a processor for controlling a CD-ROM decoder and an MPEG decoder. Since a CD player represents a closed system in which it is not possible to access the servo-processor without intervention in the device and a decoder for the CD-ROM table of contents is not provided in the CD player, the table of contents of the CD-I or CD-ROM cannot be decoded and used for the purpose of control. In order to provide the purchaser of a CD player with the option additionally to play back recording media having a CD-like format, such as CD-ROM, CD-I or CD-V, for example, on the CD player and at the same time, in an analogous manner to a player provided specifically for the recording format, optionally to enable access to individual sequences of the information stored on the recording medium, a CD player which has a virtual table of contents is provided. In order to be able sequentially to access the content of a recording medium having a recording format which differs from the CD, a virtual table of contents is provided which is formed by a predetermined assignment of start times to a number of titles by means of a processor. For this purpose, it is possible to use a program which is provided in the processor and by means of which, for example, a title is assigned a start time corresponding to its title number, or to use a ROM memory or else the RAM that is usually provided for storing the table of contents of a CD. The access is preferably made using the means which are provided for access to the titles of a CD. From the point of view of random access to sequences of a CD-I full motion video disc, the virtual table of contents has preferably 74 assumed titles, since the maximum playing time of a CD-I full motion video disc is limited to 74 minutes. As a result, the user can sequentially access the content of the recording medium even though the recording medium has a recording format which differs from the CD and the table of contents cannot be read by the CD player. The interval between the sequences to which random access is made is one minute in this case.

In accordance with a second design, 99 titles are provided in the virtual table of contents. This selection of titles corresponds to the maximum number of titles which are provided for a CD in accordance with the CD standard. The information content of a fully prerecorded recording medium is consequently divided into 99 sections, to which access can then be made sequentially. However, it is also possible to provide a number of titles which differs from the above mentioned designs.

A further aspect of the invention is being able sequentially to access the content of a recording medium despite a non-readable table of contents of the CD or of the CD-like recording medium.

If the CD player cannot read, or can only partially read, the table of contents of the recording medium, a virtual or artificial table of contents is generated which is used for the purpose of controlling the scanning device of the CD player in order sequentially to access the content of the recording medium.

By virtue of the possibility of sequential access to the content of recording media whose table of contents cannot usually be read by a CD player, the CD player becomes a universal CD player which, advantageously, additionally enables the playback of CD-I full motion video discs, CD-ROM, CD-V or other CD-like recording media. In order to reproduce the information stored on the recording medium, an appropriate additional device is connected to the output of the CD player and to a device which is suitable for reproduction of the stored information. In the case of a CD-I full motion video disc, an additional device connected to a television set then contains a CD-ROM decoder, a microcontroller and also decoders for MPEG video and MPEG audio, unless the television set already has a corresponding input which enables direct processing of signals provided by the microcontroller.

As regards the CD player, neither additional hardware nor intervention in the device for a connection to the servo-processor is necessary. With a virtual table of contents, the CD player advantageously becomes a CD player which is also suitable for the playback of recording media having a CD-like recording format. The outlay for the virtual table of contents which is additionally to be provided is low enough to be scarcely worthy of mention, since the said table of contents is implemented with the software to be provided.

As a result, it is advantageous that the scanning and servo devices which are present in the CD player and, in other players, too, do not have a significant effect on the outlay therefor are multiply utilized and the music aficionado is afforded a simple entry into the world of CD video and computers with a CD player.

BRIEF DESCRIPTION OF THE DRAWINGS

The invention is explained in more detail in an exemplary embodiment with reference to a drawing. The FIGURE illustrated shows a schematic sketch of a CD player CDP for CD-like recording formats with devices connected thereto.

DETAILED DESCRIPTION OF THE PREFERRED EMBODIMENTS

Figure 1:
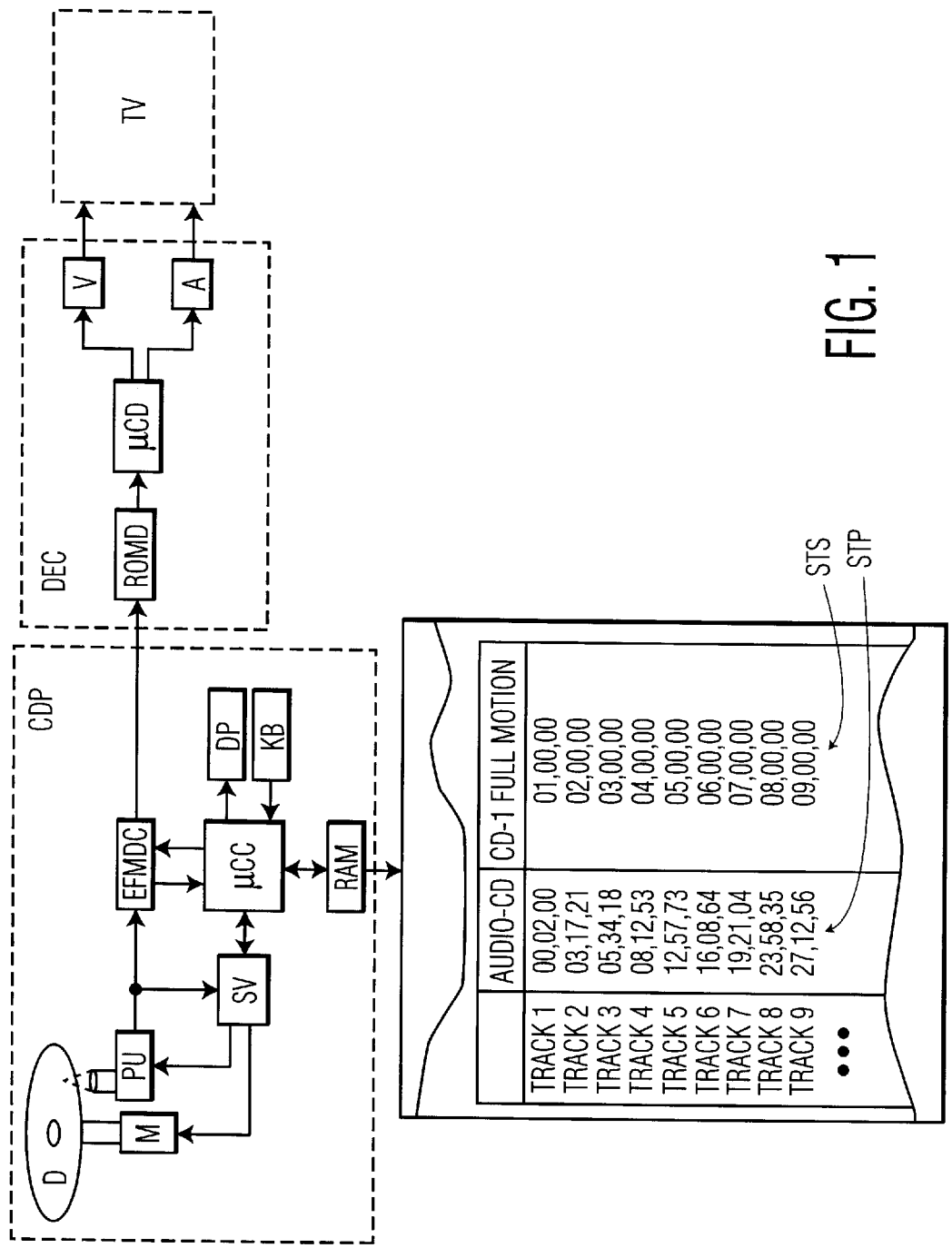

The CD player CDP illustrated in the FIGURE contains a motor M, which drives the recording medium D to be played, a scanning device PU, a servo-processor SV, a decoder EFMD, a microcontroller $\mu$CC, a display DP, an input device KB and a memory RAM provided for storage of a list of contents. The essential difference between the CD player CDP for CD-like recording formats which is illustrated in the FIGURE and known CD players consists in the memory RAM, which, in the design illustrated, contains a virtual table of contents for a recording medium D having a recording format which corresponds to a CD-I or CD-I full motion. However, the design is not restricted to recording media D of this recording format since the invention can be applied equally to all CD-like recording media D whose table of contents cannot usually be read by a CD player. All recording media D having a recording principle which corresponds to the CD are designated as CD-like recording media D. This recording principle consists in digital information storage in an information track which essentially corresponds to the information track of a CD and, in principle, can be read by a scanning device PU which is also provided for the scanning of a CD. Recording media D of this type are, for example, a CD-ROM, CD-I or CD-V. Since a CD player usually cannot decode the table of contents of a recording medium D having the recording format of a CD-I, a solution has been sought for the playback or for the reproduction of a CD-I by a CD player CDP without, in the process, significantly increasing the outlay for the CD player CDP. No additional hardware should be provided in the CD player, nor should any intervention in the CD player CDP be necessary, that is to say that the device should not be opened for the purpose of establishing additional connections to assemblies of the CD player. It is generally known that in order to play back a CD-I in a device which is similar to the customary CD player, a connection between a controller interface and the servo-processor and a processor for controlling a CD-ROM decoder and an MPEG decoder is necessary. In order, nevertheless, to ensure the playback of the recording medium D given a non-readable table of contents, an artificial or virtual table of contents is provided in the memory RAM of the CD player CDP, for example. This artificial table of contents is used when the original table of contents cannot be read or can only partially be read. As a result, the user can access the recording medium D in specific units of time and play back this recording medium in an analogous manner to a device which is provided specifically for the recording format of the recording medium D. These units of time can expediently be chosen to correspond to the recording format of the recording medium D. With regard to a recording medium D which differs from the recording format of a CD, the total playing time of the recording medium D is generally known. In order to afford the user sequential access or access to different locations on the recording medium D even in the case of a recording medium D which differs from the recording format of a CD, a virtual table of contents is generated by the servo-processor SV or microcontroller $\mu$CC, for example, in the memory RAM, and is then used to control the scanning device PU to a desired scanning location. While, in the case of a recording medium D of the recording format of an audio CD in accordance with the FIGURE, CD title start times STP of the individual titles Track 1 to Track 9 are read from the table of contents of the CD into the memory RAM, the servo-processor SV or microcontroller $\mu$CC generates a virtual table of contents in the memory RAM, for example, for a non-readable or only partially readable table of contents. The titles Track 1 to Track 9 are then preferably assigned title start times STS corresponding to the recording format of the recording medium D. Since a maximum of 99 titles Track are provided for an audio CD and the maximum playing time is limited to 74 minutes, the virtual table of contents, given a playing time of 74 minutes, may comprise, for example, 74 titles Track one minute apart. The user is thereby afforded sequential access to the recording medium D via the input device KB of the CD player CDP, which is a numeric keypad, for example.

The exemplary embodiment above was selected in particular to illustrate the principle implemented by the invention. In accordance with designs that are not illustrated, the virtual table of contents may also be formed already by a predetermined assignment of start times STS to a number of titles Track by means of a processor or ROM. By means of the processor, which may be, for example, the servo-processor SV, the microcontroller $\mu$CC, or a processor that combines both servo-processor SV and microcontroller $\mu$CC, a title Track, for example, is then directly assigned a start time STS corresponding to its title number 1, 2, . . . 99. This assignment may be provided directly, as in the design specified, so that, for example, a third title Track 3 is assigned the start time STS of 03,00,00 or three minutes, or it is possible to choose different conditions. In accordance with this design, the storage of the virtual table of contents in the memory RAM is then obviated since it is possible to jump directly to a location or title Track on the recording medium D which corresponds to the start time STS or absolute time of the playing time. Furthermore, it is also possible to provide, in a ROM memory, one or more assignments whose data can be called up by the processor in accordance with an assignment table. In principle, an assignment corresponding to the recording format can be selected using the input device KB. Already it becomes clear that numerous designs for the implementation and selection of a virtual table of contents are possible, so that the invention is not restricted to the exemplary embodiments which are specified here.

In order to reproduce the information stored on the recording medium D, a decoder DEC corresponding to the recording format of the recording medium D is connected to the CD player CDP, which decoder, in the case of a CD-I full motion recording format corresponding to the FIGURE, has a CD-ROM decoder ROMD, a microprocessor μCD and a respective MPEG decoder for video V and audio A. The outputs of the decoder DEC are connected to a television set TV provided for reproduction. Consequently, an only slightly altered CD player advantageously becomes a CD player CDP for recording media D which also differ from the recording format of a CD or for CD-like recording formats.

What is claimed is:

1. Stand alone CD player, comprising:
   means for generating a virtual table of contents for a recording medium having data formatted in accordance with a CD-like recording format stored thereon, the CD-like recording format including CD-ROM, CD-I or CD-V formats, and not being decodable by the stand alone CD player;
   means for reading data from the recording medium; and
   means for providing output to an external decoder in response to the data read from the recording medium.

2. Stand alone CD player according to claim 1, wherein the means for generating the virtual table of contents is a processor, a RAM or a ROM memory.

3. Stand alone CD player according to claim 1, wherein the virtual table of contents is formed by a predetermined assignment of start times to a number of titles.

4. Stand alone CD player according to claim 1, wherein the virtual table of contents is formed by a predetermined assignment of start times to a number of titles and a start time is formed in minutes in accordance with the number of a title.

5. Stand alone CD player according to claim 1, wherein 99 titles (Track) are provided in the virtual table of contents.

6. Stand alone CD player according to claim 1, wherein 74 titles are provided in the virtual table of contents.

7. Stand alone CD player according to claim 1, wherein the CD player is provided for the playback of a CD having a non-readable or partially non-readable table of contents.

8. Stand alone CD player according to claim 1, wherein the CD player is provided for the playback of a recording medium having a recording format which differs from a CD.

9. Stand alone CD player according to claim 1, wherein the CD player has a means for the connection of a decoder.

10. Stand alone CD player according to claim 1, wherein a virtual table of contents for sequential access to the recording medium is generated by a microcontroller of the CD player in the event of a non-readable or only partially readable table of contents of the recording medium.

* * * * *